United States Patent
Mortazavi et al.

(10) Patent No.: US 9,298,769 B1
(45) Date of Patent: Mar. 29, 2016

(54) METHOD AND APPARATUS TO FACILITATE DISCRETE-DEVICE ACCELERTAION OF QUERIES ON STRUCTURED DATA

(71) Applicant: Futurewei Technologies, Inc., Plano, TX (US)

(72) Inventors: Masood Mortazavi, San Jose, CA (US); Vincent Tak Fai Cheung, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/478,757

(22) Filed: Sep. 5, 2014

(51) Int. Cl.
*G06F 9/45* (2006.01)
*G06F 17/30* (2006.01)

(52) U.S. Cl.
CPC .... *G06F 17/30445* (2013.01); *G06F 17/30463* (2013.01); *G06F 17/30958* (2013.01)

(58) Field of Classification Search
USPC .......................................................... 717/149
See application file for complete search history.

(56) References Cited

U.S. PATENT DOCUMENTS

| | | | | |
|---|---|---|---|---|
| 7,581,022 B1 * | 8/2009 | Griffin | ..................... | H04L 45/04 370/238 |
| 8,989,046 B1 * | 3/2015 | Train | ..................... | H04L 45/02 370/252 |
| 2007/0198283 A1 * | 8/2007 | Labuda et al. | ..................... | 705/1 |
| 2008/0071748 A1 * | 3/2008 | Wroblewski et al. | ............. | 707/3 |
| 2009/0010279 A1 * | 1/2009 | Tsang et al. | ................... | 370/468 |
| 2009/0172014 A1 * | 7/2009 | Huetter | ..................... | 707/103 R |
| 2010/0121817 A1 * | 5/2010 | Meyer et al. | ................... | 707/623 |
| 2011/0067016 A1 * | 3/2011 | Mizrachi et al. | .............. | 717/149 |
| 2012/0191716 A1 * | 7/2012 | Omoigui | ....................... | 707/740 |
| 2013/0263100 A1 * | 10/2013 | Mizrachi | ................... | G06F 8/41 717/149 |
| 2014/0108414 A1 * | 4/2014 | Stillerman et al. | ............. | 707/741 |
| 2014/0320512 A1 * | 10/2014 | Seetharamaiah et al. | ..... | 345/564 |
| 2014/0337315 A1 * | 11/2014 | Slezak et al. | ................... | 707/718 |
| 2014/0380121 A1 * | 12/2014 | Grube et al. | ................... | 714/763 |

* cited by examiner

*Primary Examiner* — Chameli Das
(74) *Attorney, Agent, or Firm* — Futurewei Technologies, Inc.

(57) ABSTRACT

A method for parallel processing of data, including accessing a sub-graph of an execution plan for a query used for accessing a database by a host processor, wherein the execution plan includes operators organized into sub-graphs. The method includes generating a transformed sub-graph by transforming operators from the sub-graph for parallel execution on discrete computing devices. The method includes adding at least one first operator to the transformed sub-graph configured for allocating memory on the discrete computing devices and copying ingress variables to the allocated memory. The method includes adding at least one second operator to the transformed sub-graph for copying egress variables, wherein the transformed sub-graph comprises a plurality of intermediate variables generated during execution of the sub-graph that are fully contained within the transformed sub-graph. The method includes off-loading the transformed sub-graph to the discrete devices for execution.

16 Claims, 8 Drawing Sheets

METHOD AND APPARATUS TO FACILITATE DISCRETE-DEVICE ACCELERTAION OF QUERIES ON STRUCTURED DATA

BACKGROUND

Structured data processing often involves interpretation of a declarative query language (e.g. structured query language [SQL]) to a relational operator/algebra plan which is then interpreted into an physical execution plan, wherein the execution plan includes a plurality of primitive operators. The query can be handled by a central processing unit (CPU) through execution of the primitive operators.

When handling the query, even a simple query that involves large amounts of data can quickly become computationally complex, and may involve thousands of redundant operations. For example, a primitive operator is performed repeatedly on each new information from the database. A CPU tasked to execute a primitive operator repeatedly on new data can be inefficient because of serial processing. A more efficient solution would involve parallel processing of those primitive operators. As such, in heterogeneous compute environments, which involve discrete graphical processing units (GPUs—hereafter also referred as "d-GPU") in addition to a central processing unit (CPU) host, some of the task of physical evaluation of the query may be off-loaded by the host CPU to d-GPUs (or other similar device) for improved parallelism.

However, a processing delay is introduced when a d-GPU (or other similar device) is used for executing the physical execution plan. In particular, data transfers occur between the host CPU and the d-GPU memories. That is, for each operator executed by the d-GPU, the result is delivered back to the host CPU. This transaction involves storing the results on local memory associated with the d-GPUs, and then sending it to the host CPU through an I/O interface. Because of the nature of accessing information from a database to solve the query, execution of the primitive operators by the d-GPUs will return overwhelmingly large amounts of result data over a short period of time. In some cases the information generated by the d-GPUs that are sent back to the host CPU exceeds the capacity of the I/O interface. In those cases, a bottleneck occurs at the I/O of the host CPU. This bottleneck illustrates the trade-off between introducing parallelism and paying for this additional cost.

It would be advantageous to provide for a reliable method and system that is able to avoid the bottleneck at the I/O when performing parallel processing.

SUMMARY

In some embodiments of the present invention, a computer system for parallel processing of data is disclosed. The computer system includes memory having stored therein computer-executable instructions, and a processor executing the computer-executable instructions. The computer-executable instructions include receiving a query used for accessing a database; determining an execution plan for the query, wherein the execution plan comprises a plurality of operators organized into one or more sub-graphs, and for determining a first sub-graph of the execution plan of the execution plan; determining a first size of memory of discrete computing devices available for execution of operators in parallel related to the query; and generating a transformed first sub-graph by transforming operators from the first sub-graph that when executed on the discrete computing devices in parallel requires less memory than the first size of memory, wherein the transformed first sub-graph comprises a plurality of intermediate variables generated during execution of the transformed first sub-graph that are fully contained within the transformed first sub-graph, wherein the transformed first sub-graph is off-loaded to discrete devices for execution.

In other embodiments of the present invention, a method for parallel processing is disclosed. The method includes determining an execution plan for at least one query used for accessing a database, wherein the execution plan comprises a plurality of operators organized into one or more sub-graphs. The method includes determining a first size of memory of a plurality of discrete computing devices available for execution of operators in parallel related to the query. The method includes determining a first sub-graph of the execution plan. The method further includes generating a transformed first sub-graph by transforming operators from the first sub-graph that when executed on the plurality of discrete computing devices in parallel requires less memory than the first size of memory, wherein the transformed first sub-graph comprises a plurality of intermediate variables generated during execution of the transformed first sub-graph that are fully contained within the transformed first sub-graph. The method includes off-loading the transformed first sub-graph to the plurality of discrete devices for execution.

In still other embodiments of the present invention, a non-transitory computer-readable medium having computer-executable instructions for causing a computer system to perform a method for parallel processing of data is described. The method includes determining an execution plan for at least one query used for accessing a database, wherein the execution plan comprises a plurality of operators organized into one or more sub-graphs; determining a first size of memory of a plurality of discrete computing devices available for execution of operators in parallel related to the query; determining a first sub-graph of the execution plan; generating a transformed first sub-graph by transforming operators from the first sub-graph that when executed on the plurality of discrete computing devices in parallel requires less memory than the first size of memory, wherein the transformed first sub-graph comprises a plurality of intermediate variables generated during execution of the transformed first sub-graph that are fully contained within the transformed first sub-graph; and off-loading the transformed first sub-graph to the plurality of discrete devices for execution.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
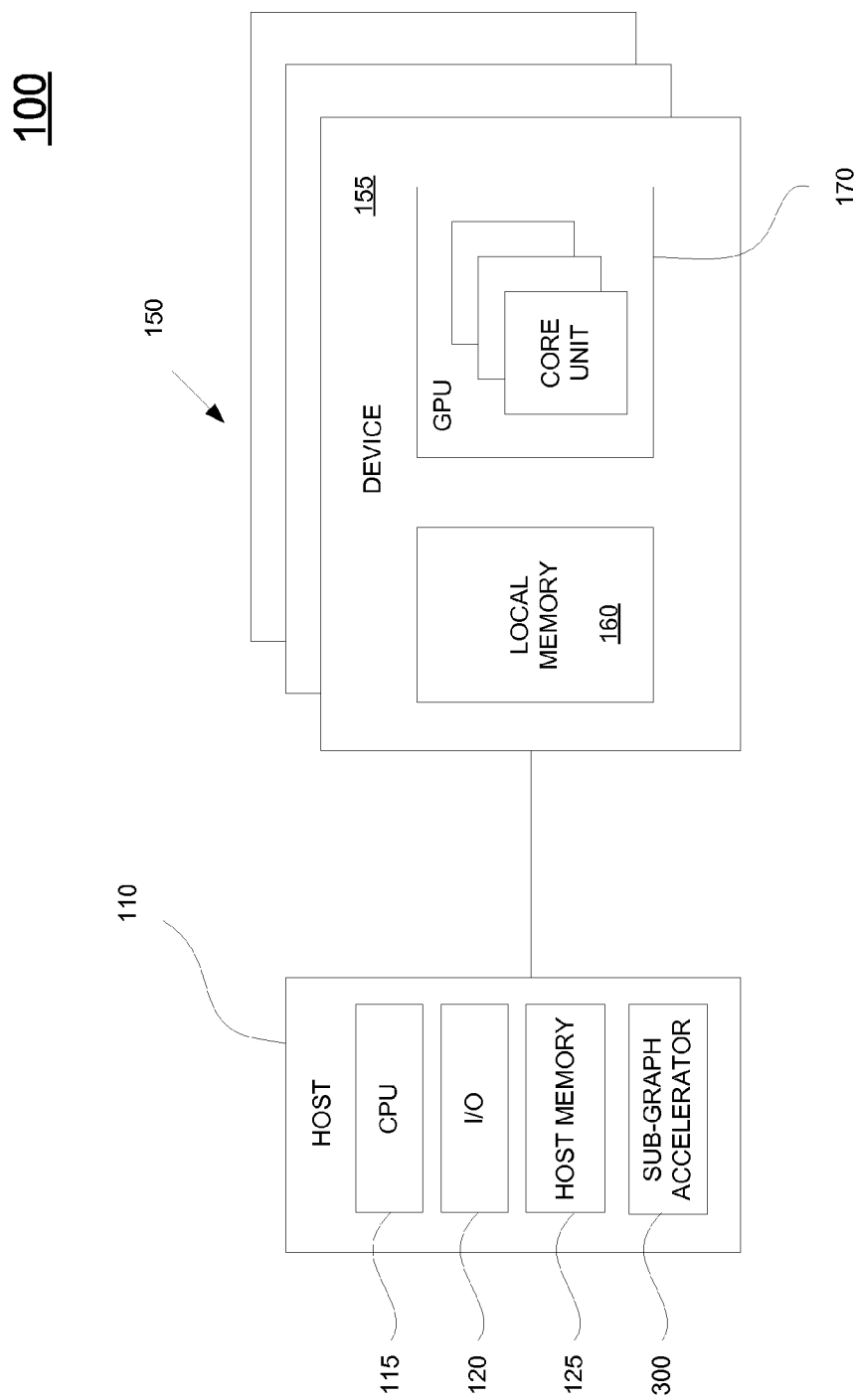
FIG. 1 is block diagram of a host system including a sub-graph accelerator for facilitating discrete-device acceleration of queries on structured data, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide for a programming model and a program transformation mechanism for more efficient integration of d-GPUs (or other similar devices) for parallel processing of structured data. In particular, embodiments of the present disclosure are able to reduce the amount of information passed back to the host CPU from the discrete devices performing parallel processing by identifying results of operations that are fully contained within a sub-graph, such that those results are not needed by operators outside of the sub-graph, but may be needed by operators within the sub-graph. Because the intermediate results are fully contained, those intermediate results do not need to be delivered back to the host CPU. In addition, embodiments of the present disclosure provide a programming model that remains human readable and can be written in the algebra language used by the query evaluation system.

Throughout this application, the term "device" or "discrete device" may be used interchangeably with "GPU" or "d-GPU" to refer to the class of such devices. Specifically, the discrete device is a general term used to represent a processing unit that is capable of performing computations in applications that are generally handled by the CPU.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities, and refer to the action and processes of a computing system, or the like, including a processor configured to manipulate and transform data represented as physical (electronic) quantities within the computer system's registers and memories into other data similarly represented as physical quantities within the computer system memories or registers or other such information storage, transmission or display devices.

Flowcharts of examples of methods for providing video segmentation are described, according to embodiments of the present invention. Although specific steps are disclosed in the flowcharts, such steps are exemplary. That is, embodiments of the present invention are well-suited to performing various other steps or variations of the steps recited in the flowcharts. Also, embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

FIG. 1 is block diagram of a computing system 100 that is configured for facilitating discrete-device acceleration of queries on structured data, in accordance with one embodiment of the present disclosure. As shown, computing system includes a host processor 110 and a plurality of discrete devices 150, including representative discrete device 155.

The plurality of discrete devices 150 are configured to execute one or more operators in parallel, at the control of the host processor 110, and more particularly the CPU 115. For example, discrete device 155 includes a GPU comprising a plurality of core processors that are specially configured for handling specialized tasks. In particular, the core processors are configured to handle the execution of a single operator (e.g., instruction) on multiple data elements accessed through the structured database in parallel using the core processors on one or more discrete devices. Local memory 160 is used to support the execution of the primitive operators without going outside of the discrete devices 150.

As shown, the host processor 110 includes a CPU 115 for handling execution of a query in association with a database. The CPU 115 is configured to execute computer-executable instructions stored in memory 125. In particular, the CPU 115 handles execution of the operators of an execution plan that is used to handle the query. The CPU 115 may off-load certain operators of sub-graphs of an execution plan to the plurality of discrete devices 150, but control of the execution of the off-loaded operators mainly resides with the CPU 115. In other implementations, CPU 115 is configured to perform the functions of one or more of the example embodiments described and/or illustrated herein, such as, the operations performed by sub-graph accelerator 300. The CPU 115 may be included within a single or multi-processor computing device or system capable of executing computer-readable instructions. In its most basic form, a computing device may include at least one processor and a system memory. Host main memory 125 is included within the host processor 110, wherein the CPU 115 directly accesses the main memory 125 for reads and writes using individual instructions. Main memory 125 generally represents any type or form of volatile or non-volatile storage device or medium capable of storing data and/or other computer-readable instructions. Examples of system memory include, without limitation, RAM, ROM, flash memory, or any other suitable memory device. Access to the main memory 125 by the CPU 115 is accomplished without the I/O 120 in one embodiment.

Also, the host I/O interface 120 handles information being passed to and from the combination of the CPU 115 and main memory 125. For instance, the I/O interface 120 is used to communicate the transfer of information between the CPU 115 and the plurality of discrete devices 150.

The host processor 110 includes a sub-graph accelerator 300. An execution plan is designed to perform the operators necessary to satisfy a corresponding query, wherein the execution plan includes one or more sub-graphs, wherein each sub-graph includes one or more operators handled by the CPU. The sub-graph accelerator 300 is configured to facilitate discrete-device acceleration of queries on structured data. In particular, the accelerator 300 is configured to identify sub-graphs that are handled by the discrete devices, such that intermediate results in the sub-graph are contained entirely within the sub-graph and do not need to be reported back to the CPU. That is, the intermediate results are not required by other operators outside of the sub-graph in question, and may or may not be needed by operators within the sub-graph. In embodiments of the present invention, intermediate results obtained during execution of a sub-graph of an execution plan are not delivered back to the CPU 115 and/or host memory 125. In that manner, the sub-graph accelerator 300 is able to reduce data exchanges between the host memory 125 and the d-GPU local memory 160, which thereby reduces and/or eliminates the main bottleneck in performing computational tasks in parallel using d-GPUs, or other similar devices. The sub-graph accelerator 300 is more fully described below in relation to FIG. 3.

Figure 2A:
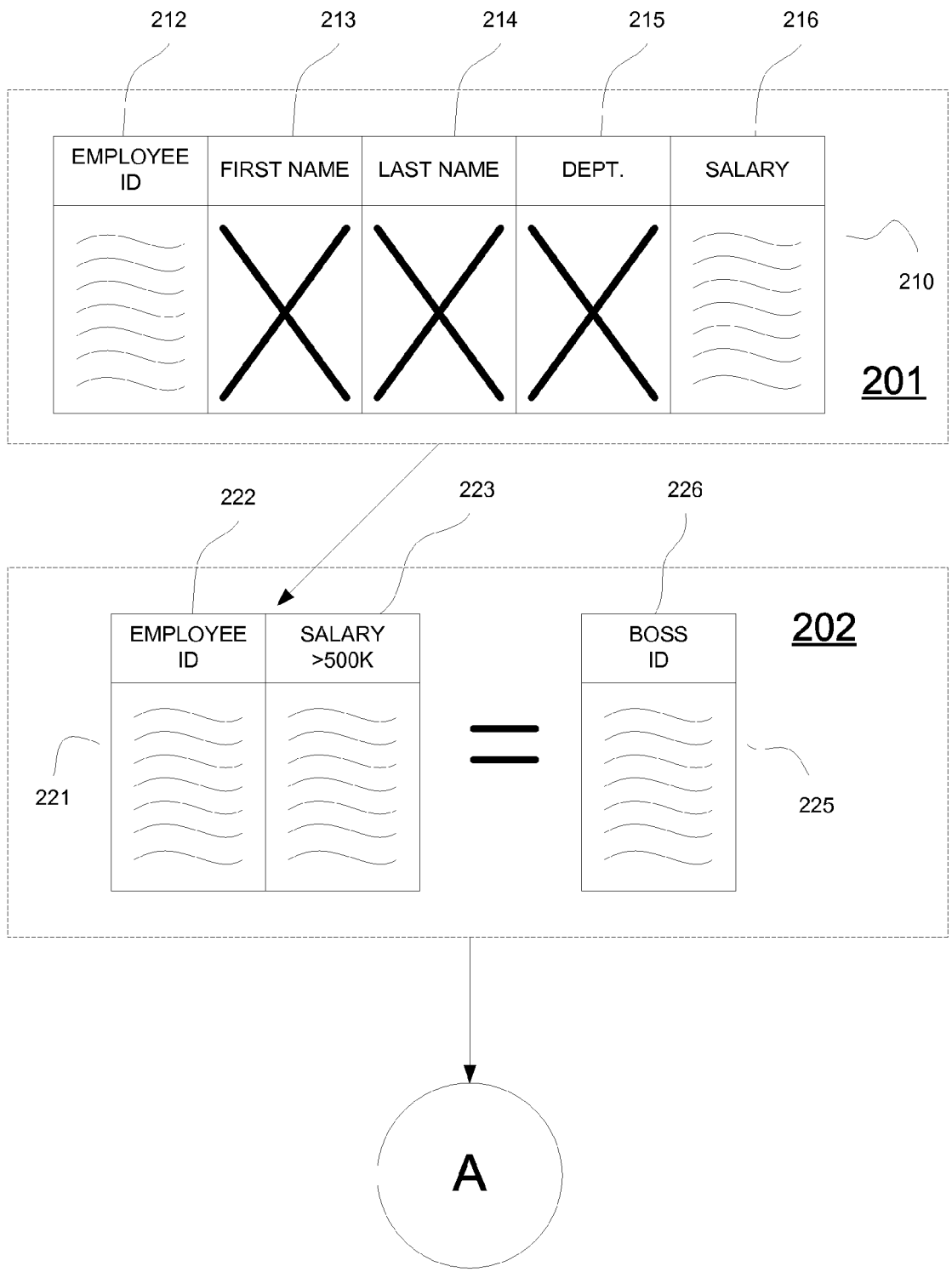
FIGS. 2A-2B are illustrations of various stages of an execution plan associated with an exemplary query of a database, wherein the query requests the identification of employees whose bosses make more than five-hundred thousand dollars per annum, in accordance with one embodiment of the present disclosure.
Figure 2B:
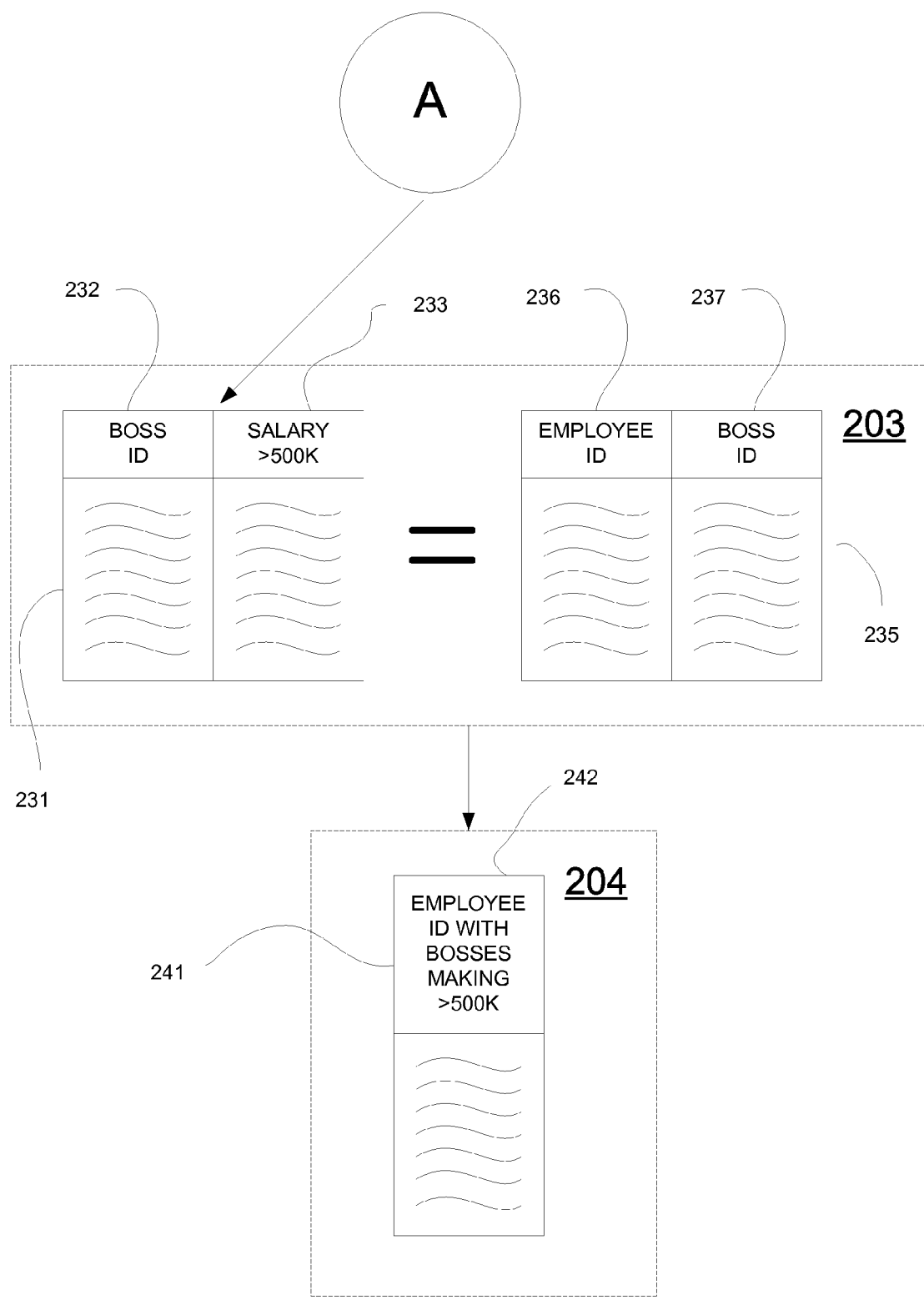

FIGS. 2A-2B are exemplary illustrations of various stages of an execution plan associated with an query of a database, wherein the query requests the identification of employees whose bosses make more than five-hundred thousand dollars per annum, in accordance with one embodiment of the present disclosure. The various stages are shown to illustrate the complexity of computer operations involved in even the simplest query when accessing a database.

Though embodiments of the present invention are described providing accelerated access to information from column based structured databases, other embodiments support the accelerated accessing of structured data in other configurations.

The database includes employee information of a corporation and is configured as a structured database. Various relational tables are generated and maintained for the corporation. For instance, table 210 includes a relational table providing information about the employees of the corporation. Table 210 includes columns 212-216. Column 212 provides employee identification information, wherein each row includes a different identifier and is associated with a different employee. Column 213 provides the first name of a corresponding employee, and column 214 provides the last name. Column 215 provides the department under which a corresponding employee is classified. Column 216 provides the salary of the corresponding employee. As such, in table 210, for each employee, information is providing including employee identifier, first name, last name, department, and salary.

The database may also include other relational tables such as, table 225. Column 226 in table 225 Another relational table 235 includes all of the identification information for bosses. Additional information for each boss may be obtained through other tables, such as, table 210, by cross-referencing the boss identification information.

Another relational table 235 provides a relationship between employees and their bosses. Table 235 includes column 236 which provides a listing of employee identification information, wherein each row includes a different employee identifier. Column 237 provides boss identification information for one or more corresponding employees. That is, for a corresponding employee associated with its identifier, a corresponding boss identifier is also provided. As such, because the information is related, the table as organized provides related information per row, such as, an employee identifier and a corresponding boss identifier.

An exemplary query to the database and its relational tables may be a request to determine which employees have bosses making more than five-hundred thousand dollars (>500K) per year. The query may be formatted in a structured query language (SQL), in one embodiment. The query provides a high level description of the request that may be understood by lay persons. The query may also be represented as relational algebra to aid in instructing a computing resource in how to handle the query. There may be more than one relational algebraic equation used to accomplish the query. The relational algebraic equation may then be transformed into an execution plan having various stages, wherein each stage accesses information and relational tables in the structured database.

As shown in FIG. 2A, in the first stage 201 of the execution plan, the employee table 210 is examined to determine which employees make more than 500K. A new column table 221 is generated that includes two columns 222 and 223 that provides a listing of employees making more than 500K. In particular, column 222 provides a listing of employee identification information, wherein each row includes a different employee identifier. Column 223 provides salary information for each of the employees identified in column 222. That is, in table 221, for each row, information is providing including employee identifier and a corresponding salary. At this time, table 221 includes both employees and bosses that make more than 500K.

As shown in the second stage 202 of the execution plan, a join is made to combine records from table 221, providing a list of employees making more than 500K, and table 225 providing a list of bosses. That is, information that is equal in both tables is extracted to generate a resulting table 231 that identifies bosses making more than 500K. Specifically, in table 231, for each row, information is providing including a boss identifier and a corresponding salary, that is filtered to be above 500K.

As shown in the third stage 203 of the execution plan, a join is made to combine records from table 231, providing a list of bosses making more than 500K, and table 235 providing a relationship between employees and their bosses, as previously described. That is information that is equal in both tables is extracted to generate table 241 in the fourth stage 204 that identifies those employees whose bosses make more than 500K. In table 241, a single column 242 provides a list of those employees.

Figure 3:
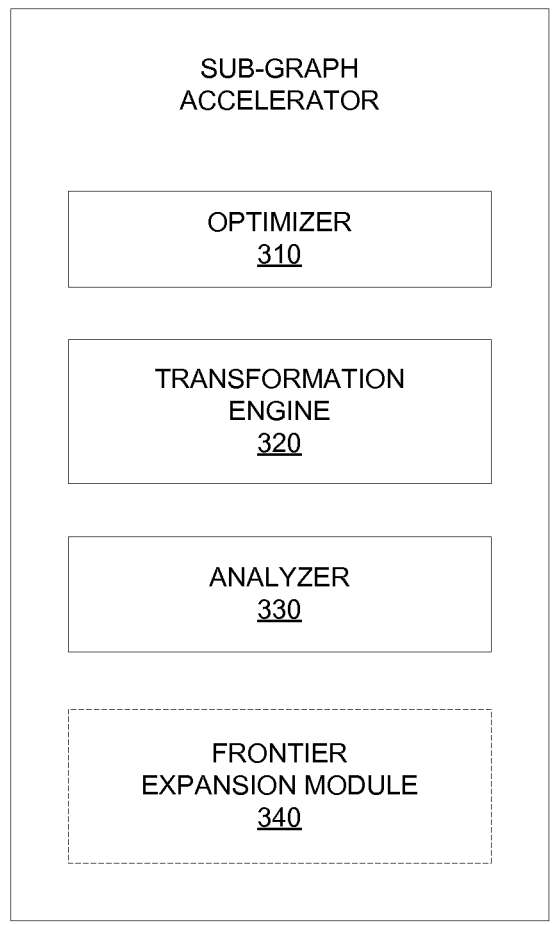
FIG. 3 is block diagram of a sub-graph accelerator configured for facilitating discrete-device acceleration of queries on structured data, in accordance with one embodiment of the present disclosure.

FIG. 3 is block diagram of a sub-graph accelerator 300 configured for facilitating discrete-device acceleration of queries on structured data, in accordance with one embodiment of the present disclosure. The accelerator 300 is configured to identify sub-graphs in an execution plan directed for execution on a host CPU, and then transform the operators in the sub-graph for parallel execution on discrete devices, such as, d-GPUs. That is, the accelerator 300 is part of a programming model which can be used to transform whole sub-graphs of structured data processing operators to equivalent operator graphs that can be efficiently executed in d-GPUs. In one embodiment, the sub-graph accelerator 300 is included in the host processor, such as host 110 described in FIG. 1, and in other embodiments, the accelerator 300 is remote from the host processor.

As such, the sub-graph accelerator 300 is configured to work in conjunction with a host processor that is configured for receiving a query used for accessing a database. In addition, the sub-graph accelerator 300 is configured to facilitate acceleration of queries on a plurality of discrete computing devices configured for parallel execution. That is, the accelerator 400 assumes that the concept of operator signature exists, that variables are produced and consumed by these operators, and that variable dependencies can be discovered at the level of algebra in order to identify independent sub-graphs that contain intermediate variables that need not be reported back to the host CPU.

As shown in FIG. 3, an optimizer 310 is configured for determining an execution plan for the query, and is able to determine the most efficient way to implement the query as executed by a corresponding CPU. In particular, the execution plan comprises a plurality of operators organized into one or more sub-graphs. The operators describe the sequence of codes or instructions to be executed by the targeted CPU. For example, an exemplary execution plan is described in FIGS. 2A-2B.

In addition, the optimizer 310 is configured to determine a first sub-graph of the execution plan. The first sub-graph is selected for off-loading to one or more discrete devices in accordance with one or more requirements. In particular, an analyzer 330 is configured for determining a first size of memory of the plurality of discrete devices, or discrete computing devices available for execution of operators in parallel related to said query. The first sub-graph is selected such that when executed on the plurality of discrete computing devices in parallel, the first sub-graph requires less memory than said first size of memory. In that manner, the first sub-graph can be executed entirely on the discrete computing devices without using memory other than local memory, which increases processing speed.

The sub-graph accelerator 300 also includes a transformation engine 320 configured for generating a transformed first sub-graph by transforming operators from the first sub-graph that are directed to the host CPU, to corresponding operators that are directed to the discrete devices. In particular, the transformed first sub-graph includes a plurality of intermediate variables generated during execution of the transformed first sub-graph that are fully contained within the transformed first sub-graph. That is, the first sub-graph is selected such that the transformed first sub-graph has intermediate variables within a boundary or frontier.

The boundary or frontier of the transformed first sub-graph is defined by upper and lower boundaries that completely encompasses the plurality of intermediate variables. The upper boundary includes a first set of operators accessing a plurality of ingress variables. The lower boundary includes a second set of operators outputting a plurality of egress variables. In one embodiment, the lower boundary is set to include an operator that requires reporting of an output variable to the host CPU. The lower boundary limits the reporting of variables to the host CPU to the egress variables, such that only egress variables are reported to the host CPU. The intermediate variables are contained within the transformed sub-graph, such that operators outside of the sub-graph do not require those intermediate variables. Operators within the sub-graph may or may not require the intermediate variables. As such, results from the intermediate variables need not be reported outside of the sub-graph, and specifically are not reported to the host CPU, thereby avoiding the bottleneck at the I/O interface to the CPU. The transformed first sub-graph is off-loaded to the plurality of discrete devices for execution An optional frontier expansion module 340 is provided in some embodiments, and is configured to dynamically expand the boundary or frontier of the transformed first sub-graph during execution. Specifically, a collector is configured for collecting (e.g., garbage collecting) at least one of the plurality of intermediate variables. That is, the local memory storing the selected intermediate variable is freed and made available. The frontier expansion module 340 is configured for dynamically expanding the frontier of the transformed first sub-graph by expanding the lower boundary to include additional intermediate variables within the transformed first sub-graph. The operators used to generate the additional intermediate variables use memory made available through the collection.

Figure 4A:
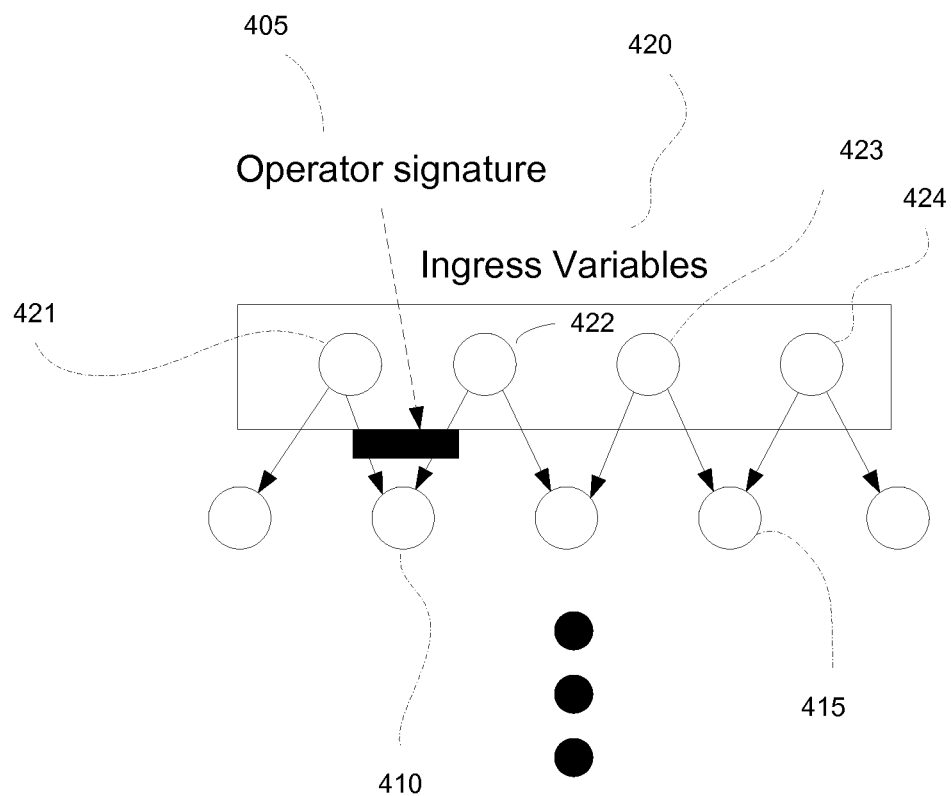
FIGS. 4A-4C are illustrations of the transformation of a sub-graph to facilitate discrete-device acceleration of queries on structured data, in accordance with one embodiment of the present disclosure.
Figure 4B:
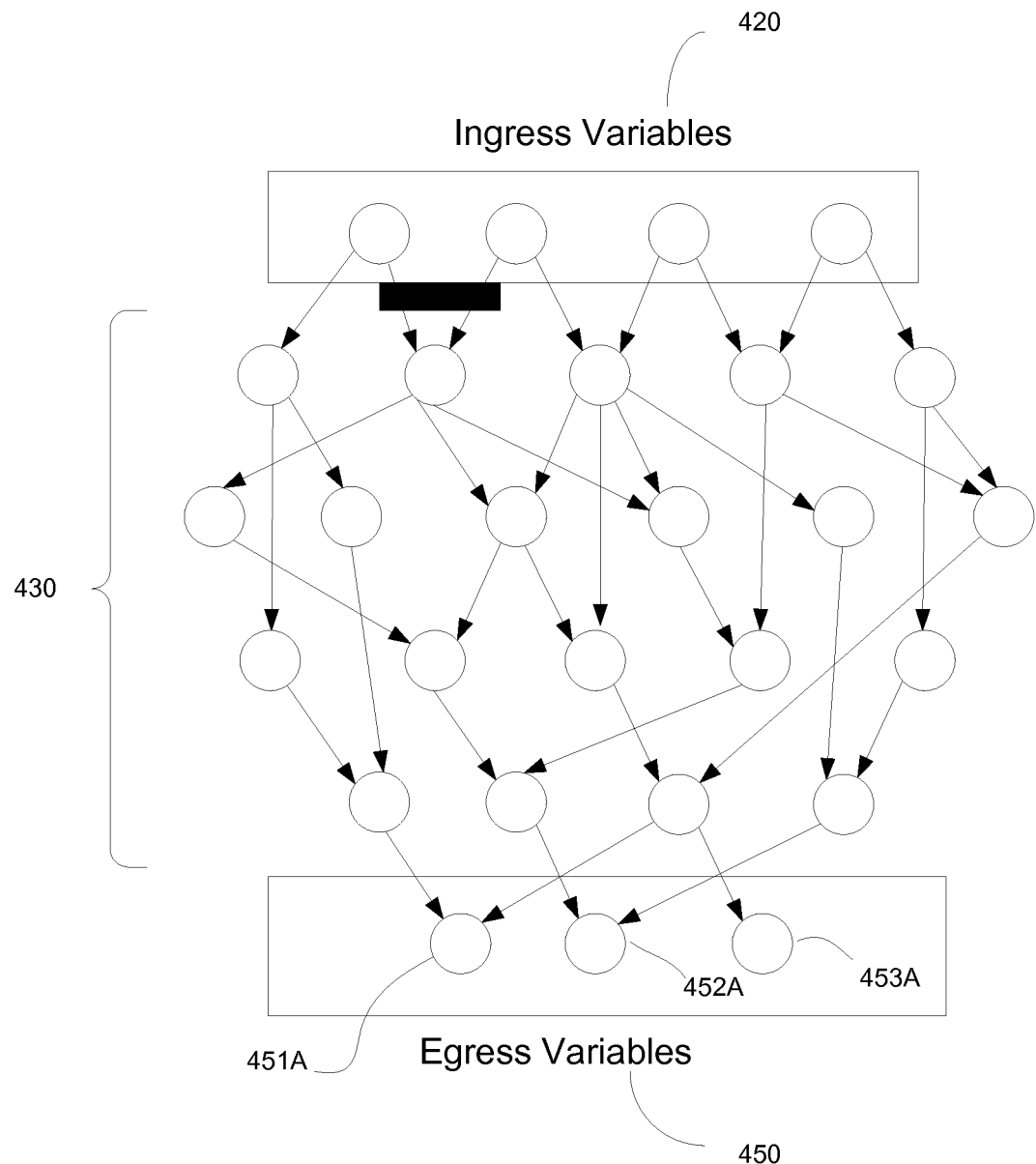
Figure 4C:
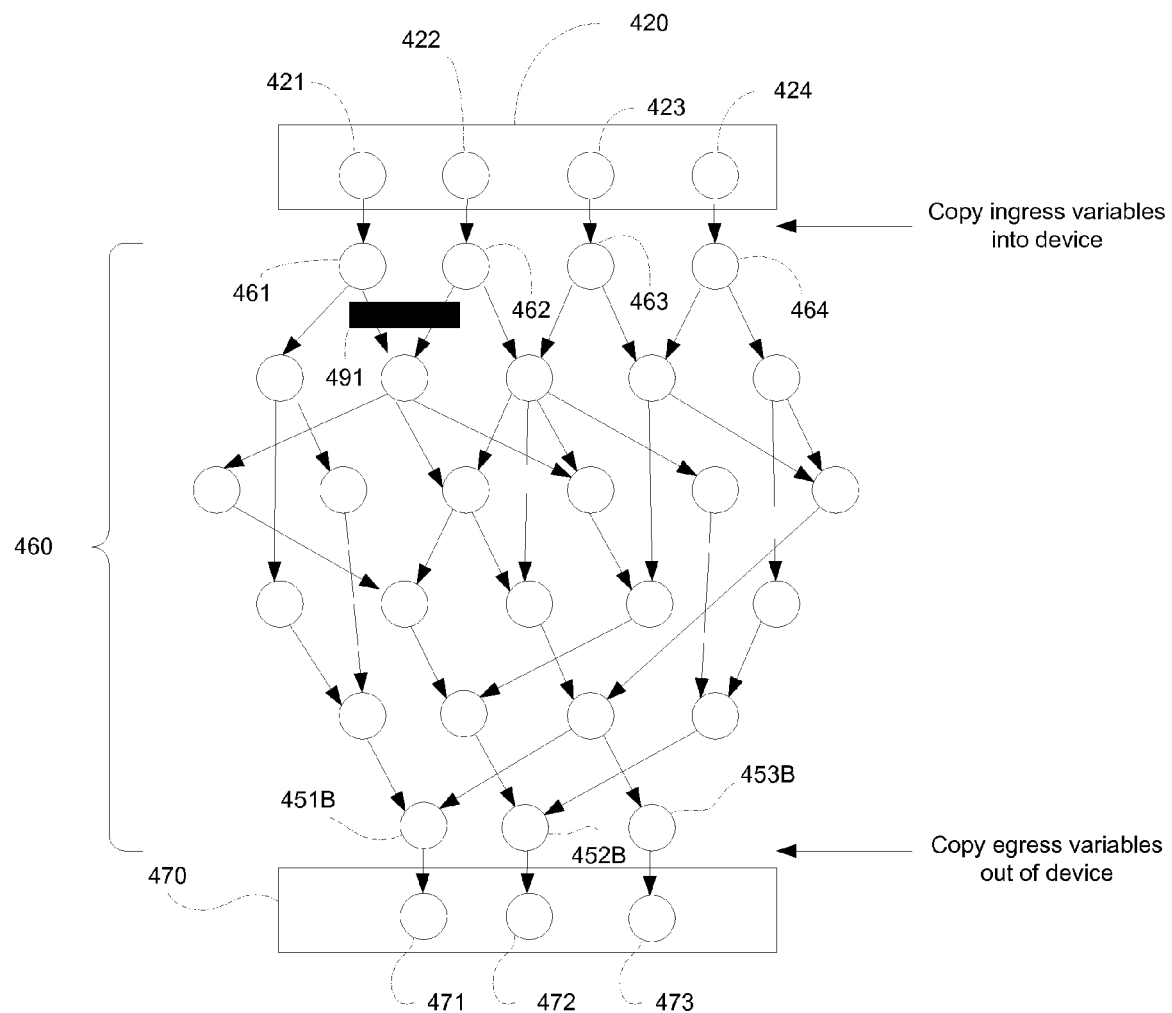

FIGS. 4A-4C are illustrations of the transformation of a sub-graph to facilitate discrete-device acceleration of queries on structured data, in accordance with one embodiment of the present disclosure. FIGS. 4A-4B show a sub-graph before transformation, and is directed to a host CPU for execution. FIG. 4C has been transformed, and is directed to a plurality of discrete devices for execution.

In one embodiment, the execution plan or operator graphs are directed graphs. The directed graphs generally do not admit cycles. Embodiments of the present invention are able to also support directed graphs or other special graphs that may admit cycles but have exit criteria.

As shown in FIG. 4A, the upper boundary 400A of a first sub-graph includes a plurality of ingress variables 420, that are input into the first sub-graph. For instance, in FIG. 4A, a plurality of ingress variables 420 is copied and stored, and includes ingress variables 421, 422, 423, and 424. An exemplary operator 405 includes an operator signature that comprises a pair of variables, which are ingress variables 421 and 422. The operator 405 produces an output comprising an intermediate variable 410 that is then provided to another operator within the transformed first sub-graph. For purposes of clarity, other operators are not shown in the upper boundary 400A. For instance, an operator takes an ingress variables 423 and 424, and produces an output, intermediate variable 415.

FIG. 4B illustrates the first sub-graph 400B. A plurality of ingress variable 420 is provided as input to the first sub-graph, as previously described. A plurality of intermediate variables 430 is included within the first sub-graph 400B. The first sub-graph is identified as having intermediate variables that are fully contained within the first sub-graph, such that intermediate variables are not required by operators outside of the first sub-graph. That is, the first sub-graph has been marked for being off-loaded to the plurality of discrete devices. As an output to the first sub-graph, a plurality of egress variables 450 is provided, and includes variables 451A, 452A, and 453A.

FIG. 4C illustrates a transformed first sub-graph that is suitable for execution by a plurality of discrete devices. Specifically, the first sub-graph 400B is transformed to a new sub-graph for efficient execution on the plurality of discrete devices (e.g., d-GPUs). During transformation, new operators for ingress and egress data copying are added. For example, the plurality of ingress variables 420 are copied into the local memory of the plurality of discrete devices. Variables 461, 462, 463, and 464 are copied variables that are now deliverable to other operators within the transformed first sub-graph.

A plurality of intermediate variables 460 is shown in the transformed first sub-graph. The intermediate variables 460 are fully contained within the first sub-graph, such that operators outside of the transformed first sub-graph do not need those variables for execution. The intermediate variables 460 may or may not be needed or requested by other operators within the transformed first sub-graph. For example, operator 491 has a signature that includes variables 461 and 462 as input variables. However, a resulting variable may not necessarily comprise an input into another operator.

The plurality of intermediate variables 460 also includes variables 451B, 452B, and 453B. These variables are analogous to the output variables 451A, 452A, and 453A, of FIG. 4B, which are outputs to the untransformed first sub-graph. That is, no further operators or operations require these variables 451B, 452B, and 453B. As shown in FIG. 4C, operators (not shown) copy the egress variables 451B, 452B, and 453B out of the device in the transformed first sub-graph. The plurality of egress variables 471, 472, and 473 are copied, stored and reported to the host CPU.

Figure 5:
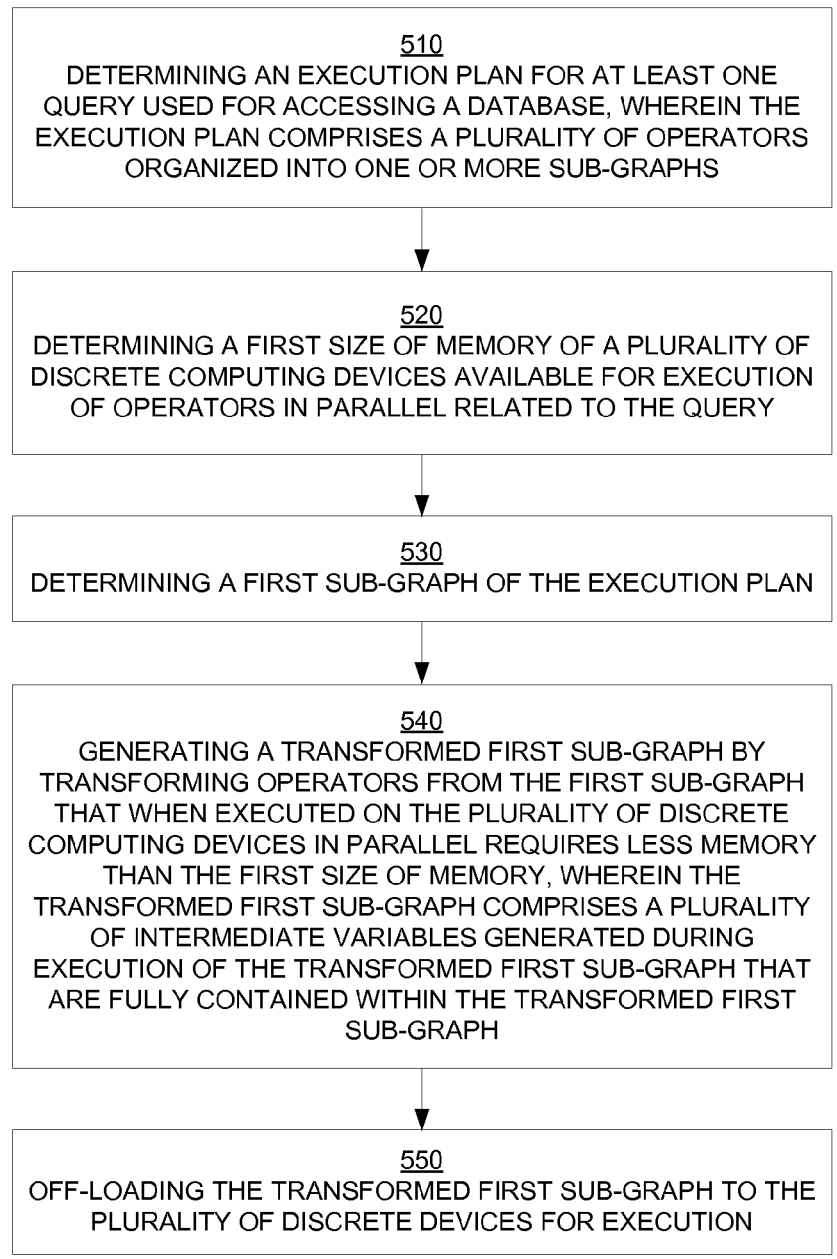
FIG. 5 is a flow diagram illustrating a method for transforming a sub-graph of an execution plan for execution on a plurality of discrete-devices, in accordance with one embodiment of the present disclosure.

FIG. 5 is a flow diagram 500 illustrating a method for transforming a sub-graph of an execution plan for execution on a plurality of discrete-devices, in accordance with one embodiment of the present disclosure. In one embodiment, flow diagram 500 illustrates a computer implemented method for transforming a sub-graph of an execution plan for execution on a plurality of discrete-devices. In another embodiment, flow diagram 500 is implemented within a computer system including a processor and memory coupled to the processor and having stored therein instructions that, if executed by the computer system causes the system to execute a method for transforming a sub-graph of an execution plan for execution on a plurality of discrete-devices. In still another embodiment, instructions for performing the method are stored on a non-transitory computer-readable storage medium having computer-executable instructions for causing a computer system to perform a method for transforming a sub-graph of an execution plan for execution on a plurality of discrete-devices. The operations of flow diagram 500 are implemented within the host processor 110 and sub-graph accelerator 300, of FIGS. 1 and 3, respectively, in some embodiments of the present disclosure.

At 510, the method includes determining an execution plan for at least one query used for accessing a database. The execution plan includes a plurality of operators organized into one or more sub-graphs. For example, the execution plan is generated by an optimizer, which determines which is the most efficient way to satisfy the query. At this point, the execution plan is directed to a host CPU for execution.

At 520, the method includes determining a first size of memory of a plurality of discrete computing devices available for execution of operators in parallel related to the query. This is necessary to preliminarily determine which sub-graphs of the execution plan can be transformed and off-loaded to a plurality of discrete devices for parallel execution.

At 530, the method includes a mechanism for selecting a proper operator sub-graph for execution on the discrete devices. Specifically, the method includes determining a first sub-graph of the execution plan. In one embodiment, it is assumed that it is not possible to execute the full query evaluation graph or execution plan of data processing operators on the plurality of discrete GPUs. Large volumes of data compared to the available memory on devices cause this practical limitation. In this manner, the execution plan is then grouped into one or more sub-graphs. For instance, a sub-graph may be operating on a piece of a column of data, instead of the entire column of data, due to memory constraints.

At 540, the method includes generating a transformed first sub-graph by transforming operators from the previously identified first sub-graph. The transformed operators when executed on the plurality of discrete computing devices in parallel require less memory than the first size of memory locally available to the discrete computing devices. For instance, an upper bound of memory is determined and compared to the available memory. The upper bound is the maximum memory needed to execute the operators included within the transformed first sub-graph. The upper bound may be adjusted with additional information, such as, selectivity information that provides further identifying information in the database. For instance, in the previous execution plan described in FIGS. 2A-2B determining how many employees have bosses making more than 500K, selectivity information may be provided that indicates that the number of employees making more than 500K is less than a threshold. That is, not all employees can make over 500K, and the selectivity information will provide a cap. In that case, the upper bound of the memory needed to store table 221 may be limited or further capped by the selectivity information, instead of reserving memory available to store all the employees in the corporation. That is, the upper bound of memory needed is adjusted based on the selectivity information related to data contained within the database, wherein that memory is potentially accessed and needed during the execution of the transformed first sub-graph.

During transformation, a programming model is used to transform whole sub-graphs of structured data processing operators to equivalent operator graphs that can be efficiently executed in discrete devices. As such, for every primitive data processing operator on the host CPU, there is a complementary primitive operator that can be executed on the discrete devices.

The transformed first sub-graph comprises a plurality of intermediate variables that are generated during execution. The intermediate variables are fully contained within the transformed first sub-graph, such that these variables are not required by operators outside of the transformed first graph. The plurality of discrete devices have their own additional memory for holding these intermediate results. Because there exists a cost in data exchanges between the device and the host, these intermediate variables are not reported back to the host CPU, thereby reducing a data bottleneck at the host I/O interface.

At 550, the method includes off-loading the transformed first sub-graph to the plurality of discrete devices for execution.

Returning to the transformation of the sub-graph for execution on the discrete devices, once an operator sub-graph (e.g., the first sub-graph) has been selected for execution on the plurality of discrete devices, the first sub-graph is bounded by identifying its input and output data. This prepares the first sub-graph for two types of transformation, wherein the first transformation addresses data exchange, and the second transformation transforms operators.

The first transformation allows for the exchanging of data between the host CPU and the plurality of discrete devices. These occur at the boundaries of the transformed first sub-graph, such as, during handling of input and output variables impinging or exiting the transformed first sub-graph. Specifically, instructions or operators are added at the ingress to the transformed first sub-graph to allocate space in local memory for the input data on the plurality of discrete devices. For example, at least one first operator (from a set of first operators) is added to the transformed first sub-graph, that is configured for allocating memory on the discrete devices, and copying the ingress variables to the allocated memory. As such, input data is transferred from the host memory to the local memory that is allocated on the plurality of discrete devices.

Similarly, instructions or operators are added at the egress of the transformed first sub-graph to copy and report egress variables. For example, at least one second operator (from a set of second operators) is added to the transformed first sub-graph, that is configured for copying a plurality of egress variables to host memory. That is, at the egress of the transformed first sub-graph, instructions are generated to allocate memory in the host CPU, and move the egress result of the sub-graph from local memory of the discrete devices to the main host CPU.

The second type of transformation replaces the operators originally targeting the host CPU with equivalent operators that targets the plurality of discrete devices. That is, the operators in the first sub-graph which originally targeted the host CPU is now transformed for execution on the plurality of discrete devices. For instance, the transformation first replaces host CPU function/operator calls with their complementary discrete device function/operator calls. For illustration purposes only, an example of replacement or transformation within the context of a particular columnar algebra is provided as follows: the algebraic operation of "X:=leftfetchjoin(Y,Z)" is transformed to "X:=gpu_leftfetchjoin(Y,0,Z,1)".

In one embodiment, during transformation, an analysis is performed to identify the first opportunity to free an intermediate result. That is, it is determined when an intermediate result from a transformed operator is no longer needed by another operator in the transformed first sub-graph. For example, this may involve graph analysis to discover variable dependencies on the operator sub-graph. In this case, intermediate variables that are no longer needed may be identified to free corresponding memory. Freeing intermediate results as soon as possible allows the optimizer 310 to offload larger query evaluation sub-graphs to the plurality of discrete devices.

Once these first opportunities for freeing device memory resources are encountered, a hint is sent to the device primitive operator for each of its variables. This hint is sent in the dual variable which exists for any primitive operator variable in the device version of a primitive operator. Specifically, each variable in the signatures of the primitive operators in the transformed first sub-graph is enhanced with pin information. That is, for each processing operator that is defined/implemented for the host CPU, an equivalent processing operator can be defined/implemented for a discrete device, with one additional difference—for each variable in the signature of the host operator, there are two variables in the signature of the discrete device operator. The first variable in the pair is equivalent to the variable in the signature of host operator. The second variable in the pair (e.g., represented as a boolean or a single bit) describes whether the discrete device memory allocated for the first variable can be freed upon the execution of the device operator. Throughout this application, the second variable is referred to as the "pin" variable, wherein the operator signature in the transformed first sub-graph is enhanced to include pin or non-pin information.

In one implementation, if the pin is "1", the implementation of discrete device version of the primitive operator does not free the space taken up by the variable in local memory. However, if the pin is "0", the device version of the primitive operator is given permission to free the space taken up by the variable in local memory, as soon as the variable is no longer needed. For example, in the example provided above, the variable Z is pinned in local memory and saved, while the instruction for "gpu_leftfetchjoin" frees the variable Y in local memory once the variable X is prepared by "gpu_leftfetchjoin". This decision is made based on the fact that the variable Z will be used later in the sub-graph.

Given the pin information, the decision to offload sub-graphs to the plurality of discrete devices can be adaptively adjusted. That is, at least one of the plurality of intermediate variables can be collected, wherein the memory used to store that variable is freed and made available. In that case, the first size of memory, for the plurality of dedicated computing devices available for execution of operators in parallel related to the query, is adjusted or expanded based on newly available memory due to collection of the corresponding intermediate result from memory. That is, the available memory can be dynamically adjusted and made available to the additional operators outside of the originally identified and transformed first sub-graph. Specifically, a frontier of the transformed first sub-graph can be expanded by extending the lower boundary to include additional intermediate variables within the transformed first sub-graph. That is, operators used to generate the additional intermediate variables use memory made available through the collecting, and wherein the frontier is defined by said upper and lower boundaries.

In one embodiment, the transformed first sub-graph is nested into a kernel or super kernel. Specifically, a function call is assigned to the transformed first sub-graph to off-load execution control to the plurality of dedicated computing devices. That is, control of the execution of the operators in the transformed first sub-graph is handled by the discrete devices. For instance, an additional transformation can offload operator sub-graph program execution control, in its entirety, to the discrete devices. This transformation would encapsulate the transformed first sub-graph that only involves intermediate results, ingress and egress variables, in a device kernel/operator in its entirety.

Thus, according to embodiments of the present disclosure, systems and methods are described for facilitating discrete-device acceleration of queries on structured data. That is, operator sub-graphs that are identified and transformed for off-loading to special discrete devices for more efficient, parallel execution, wherein intermediate results in a given off-loaded, transformed sub-graph is retained and reused within the d-GPU-like devices, instead of being swapped back and forth between the host CPU and local device memory.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes, substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer system for parallel processing of data, comprising:
   memory having stored therein computer-executable instructions; and
   a processor executing said computer-executable instructions including:
      receiving a query used for accessing a database;
      determining an execution plan for said query, wherein said execution plan comprises a plurality of operators organized into one or more sub-graphs, and for determining a first sub-graph of said execution plan;
      determining a first size of memory of discrete computing devices available for execution of operators in parallel related to said query; and
      generating a transformed first sub-graph by transforming operators from said first sub-graph that when executed on said discrete computing devices in parallel requires less memory than said first size of memory, wherein said transformed first sub-graph comprises a plurality of intermediate variables generated during execution of said transformed first sub-graph that are fully contained within said transformed first sub-graph, upper and lower boundaries of said transformed first sub-graph completely encompass said plurality of intermediate variables, said upper boundary comprises a first set of operators accessing a plurality of ingress variables and said lower boundary comprises a second set of operators outputting a plurality of egress variables, said plurality of intermediate variables are not accessed by operators outside of said transformed first sub-graph and said transformed first sub-graph is off-loaded to discrete devices for execution.

2. The computer system of claim 1, wherein said computer-executable instructions as executed by said processor further comprises:
   dynamically expanding a frontier of said transformed first sub-graph by expanding said lower boundary to include additional intermediate variables within said transformed first sub-graph, wherein operators used to generate said additional intermediate variables use memory made available through said collection at least one of said plurality of intermediate variables, wherein said frontier is defined by said upper and lower boundaries.

3. The computer system of claim 2, wherein said computer-executable instructions as executed by said processor further comprises:
   determining an upper bound of memory necessary for execution of operators included within said transformed first sub-graph; and
   adjusting said upper bound based on selectivity information related to data contained within said database.

4. The computer system of claim 1, wherein a discrete device comprises a graphic processing unit (GPU).

5. The computer system claim 1, wherein when said processor is executing said instructions, at least one query comprises a Structured Query Language (SQL) query.

6. A method for parallel processing of data executed by a processor configured to manage queried searches to a database stored in memory, comprising:
   determining an execution plan for at least one query used for accessing said database, wherein said execution plan comprises a plurality of operators organized into one or more sub-graphs;
   determining a first size of memory of a plurality of discrete computing devices available for execution of operators in parallel related to said query;
   determining a first sub-graph of said execution plan;
   generating a transformed first sub-graph by transforming operators from said first sub-graph that when executed on said plurality of discrete computing devices in parallel requires less memory than said first size of memory, wherein said transformed first sub-graph comprises a plurality of intermediate variables generated during execution of said transformed first sub-graph that are fully contained within said transformed first sub-graph, upper and lower boundaries of said transformed first sub-graph completely encompasses said plurality of intermediate variables, said upper boundary comprises a first set of operators accessing a plurality of ingress variables and said lower boundary comprises a second set of operators outputting a plurality of egress variables, and said plurality of intermediate variables are not accessed by operators outside of said first sub-graph; and off-loading said transformed first sub-graph to said plurality of discrete devices for execution.

7. The method of claim 6, wherein said generating a transformed first sub-graph comprises:

determining an upper bound of memory necessary for execution of operators included within said transformed first sub-graph.

8. The method of claim 7, further comprising:

adjusting said upper bound based on selectivity information related to data contained within said database and potentially accessed during execution of said transformed first sub-graph.

9. The method of claim 6, further comprising:

setting said lower boundary to include an operator that requires reporting of an output variable to a central processing unit (CPU); and limiting reporting of variables to said corresponding central processing unit (CPU) to said plurality of egress variables.

10. The method of claim 6, further comprising:

dynamically expanding a frontier of said first sub-graph by expanding said lower boundary to include additional intermediate variables within said first sub-graph, wherein operators used to generate said additional intermediate variables use memory made available through collection of at least one of said plurality of intermediate variables, wherein said frontier is defined by said upper and lower boundaries.

11. The method of claim 6, wherein said plurality of discrete devices comprises a plurality of graphic processing units (GPUs).

12. The method of claim 6, wherein said at least one query comprises a Structured Query Language (SQL) query, and wherein said database comprises a column-oriented database.

13. The method of claim 6, further comprising:

assigning a function call to said first sub-graph.

14. A non-transitory computer-readable storage medium having computer-executable instructions for causing a computer system to perform a method, comprising:

determining an execution plan for at least one query used for accessing a database, wherein said execution plan comprises a plurality of operators organized into one or more sub-graphs;

determining a first size of memory of a plurality of discrete computing devices available for execution of operators in parallel related to said query;

determining a first sub-graph of said execution plan;

generating a transformed first sub-graph by transforming operators from said first sub-graph that when executed on said plurality of discrete computing devices in parallel requires less memory than said first size of memory, wherein said transformed first sub-graph comprises a plurality of intermediate variables generated during execution of said transformed first sub-graph that are fully contained within said transformed first sub-graph, upper and lower boundaries of said transformed first sub-graph completely encompasses said plurality of intermediate variables, said upper boundary comprises a first set of operators accessing a plurality of ingress variables and said lower boundary comprises a second set of operators outputting a plurality of egress variables, and said plurality of intermediate variables are not accessed by operators outside of said first sub-graph; and off-loading said transformed first sub-graph to said plurality of discrete devices for execution.

15. The non-transitory computer-readable storage medium of claim 14, wherein said generating a transformed first sub-graph in said method comprises:

determining an upper bound of memory necessary for execution of operators included within said transformed first sub-graph.

16. The non-transitory computer-readable storage medium of claim 15, wherein said method further comprises:

adjusting said upper bound based on selectivity information related to data contained within said database and potentially accessed during execution of said transformed first sub-graph.

* * * * *